United States Patent Office 3,414,579
Patented Dec. 3, 1968

3,414,579
PROCESS FOR PREPARING ACID SULFURIC ACID ESTERS FROM AROMATIC COMPOUNDS CONTAINING β - HYDROXY-ETHYLSULFONYL GROUPS
Hermann Remy, West Warwick, R.I., assignor to Farbwerke Hoechst Aktiengesellschaft vormals Meister Lucius & Bruning, Frankfurt am Main, Germany, a corporation of Germany
No Drawing. Filed Feb. 5, 1965, Ser. No. 430,771
Claims priority, application Germany, Feb. 18, 1964, F 42,033
3 Claims. (Cl. 260—310)

ABSTRACT OF THE DISCLOSURE

There is disclosed herein a process for making a dyestuff intermediate compound of the formula

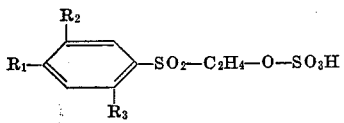

wherein $R_1$ is a hydrogen, hydroxyl, amino, aminomethyl, lower alkoxy or methylpyrazolone group, $R_2$ is a hydrogen, lower alkoxy, amino or aminobenzoylamino group, and $R_3$ is a hydrogen, chlorine, bromine, lower alkyl, lower alkoxy or carboxyl group, by esterifying a compound of the formula

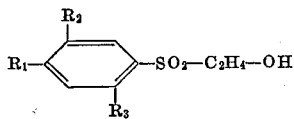

with amidosulfonic acid at an elevated temperature in the presence of an inert organic solvent.

---

It is known that aromatic compounds containing β-hydroxyethylsulfonyl groups can be converted into their acid sulfuric acid esters by treating the corresponding β-hydroxyethylsulfonyl compounds with a large excess of concentrated sulfuric acid.

The known method is disadvantageous in that the compounds containing β-hydroxyethylsulfonyl groups have to be introduced into the reaction mixture very slowly and with the utmost care in order to avoid local overheating and high losses in the yields. A further disadvantage is that it is not possible, according to the known method, to obtain a concentrated solution of the ester in simple manner. The use of an excess of concentrated sulfuric acid necessitates large amounts of alkali for the neutralization of the esterification mixture and a certain amount of ice required for dilution and cooling. Then the reaction mixture has to be worked up in a very complicated way with large amounts of salt accumulating.

Now I have found that acid sulfuric acid esters can be prepared in simple manner and in a quantitative yield from aromatic compounds containing β-hydroxyethylsulfonyl groups and having the following general formula

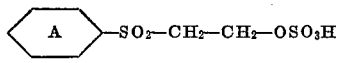

wherein benzene nucleus A may contain further substituents, by causing amidosulfuric acid to act at an elevated temperature in the presence of organic solvents on aromatic compounds of the general formula

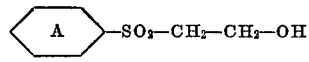

in which A has the meaning indicated above.

Compounds within the scope of this invention include those of the formula

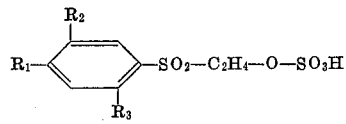

wherein $R_1$ is a hydrogen, hydroxyl, amino, aminomethyl, lower alkoxy or 3-methylpyrazol-5-one-1-yl group, $R_2$ is a hydrogen, lower alkoxy, amino, 3-aminobenzoylamino or 4-aminobenzoylamino group, and $R_3$ is a hydrogen, chlorine, bromine, lower alkyl, lower alkoxy or carboxyl group. As starting compounds of the above formula which are advantageously used in the process of the invention there may be mentioned, aromatic compounds containing β-hydroxyethylsulfonyl groups wherein benzene nucleus A may contain further substituents, for example halogen atoms, alkyl, alkoxy, hydroxy, carboxylic acid, amino or acylated amino groups, such as a benzoylamino group which may contain substituents, and heterocyclic radicals, such as a 3-methylpyrazolone-(5) radical. Compounds of this kind are, for example, 3-amino-4-hydroxy-phenyl-(1)-β-hydroxy-ethylsulfone,
3-amino-4-methoxy-phenyl-(1)-β-hydroxyethylsulfone,
4-amino-2-methyl-5-methoxy-phenyl-(1)-β-hydroxyethylsulfone,
4-amino-2,5-dimethoxy-phenyl-(1)-β-hydroxy-ethylsulfone,
3-(4'-aminobenzoylamino)-phenyl-(1)-β-hydroxyethylsulfone,
5-(3'-aminobenzoyl-amino)-2-carboxyphenyl-(1)-β-hydroxyethylsulfone,
1-[4'-β-hydroxyethyl-sulfonyl-phenyl-(1')-]-3-methylpyrazolone-(5),
4-amino-2-chloro-phenyl-(1)-β-hydroxyethylsulfone,
4-amino-2-bromo-phenyl-(1)-β-hydroxyethylsulfone,
4-(β-hydroxyethylsulfonyl)-benzylamine.

The esterification is advantageously carried out at a temperature above 60° C., preferably within the range from about 75° to 105° C. and requires only a short time. The major part of the solvent which is present during the reaction is removed from the esterification mixture, preferably by distillation at reduced pressure. The residue is dissolved in water and is directly ready for further use, for example for the preparation of dyestuffs.

As solvents suitable for carrying out the esterification there may be mentioned, for example, dimethylformamide, dimethylsulfoxide, quinoline, dimethylaniline, pyridine, picoline or lutidine or mixtures thereof.

It is remarkable that under mild reaction conditions the esterification by means of amidosulfonic acid according to the process of the invention can be carried out smoothly and completely, even in a high dilution with the solvents mentioned above. It may be considered surprising that the reaction does not unfavorably affect phenolic hydroxyl groups and amino groups and that no by-products are formed. This characteristic feature constitutes the fundamental difference between the process of the invention and the known method of esterification using an excess of concentrated sulfuric acid, sulfuric acid monohydrate or oleum. In the latter case, an incomplete reaction and/or side reactions cannot be avoided.

Without exception, the products obtained according to the process of the invention are known compounds which constitute important intermediates, for example for the preparation of dyestuffs.

The following examples serve to illustrate the invention but they are not intended to limit it thereto, the parts being by weight unless otherwise stated and the relationship

EXAMPLE 1

42.3 parts of 1-[4'-β-hydroxyethylsulfonyl-phenyl-(1')]-3-methyl-pyrazolone-(5) are introduced into 200 parts by volume of pyridine, the mixture is heated to 75° C. and 52 parts of aminosulfonic acid are added. Within a few minutes the temperature of the reaction mixture rises to 95°–100° C. and, when the evolution of heat has subsided, is kept there for 30 minutes by external heating. 150 parts by volume of pyridine are then distilled off at reduced pressure and the residue is dissolved in water.

The solution of the sulfuric acid ester which is obtained in a practically quantitative yield and corresponds to the following formula

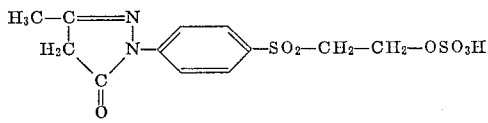

can be reacted further without isolation. By coupling the reaction solution with diazotized anthranilic acid the azo dyestuff of the formula

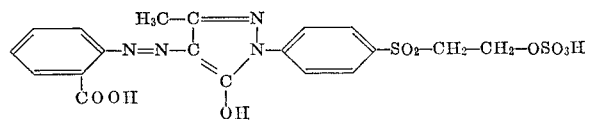

is separated. It dyes cotton greenish yellow shades.

Instead of pyridine it is also possible to use other solvents, such as quinoline, dimethylaniline, dimethylformamide, dimethylsulfoxide, picoline or lutidine or mixtures thereof.

EXAMPLE 2

43.4 parts of 3-amino-4-hydroxy-phenyl-(1)-β-hydroxy-ethylsulfone are introduced into 250 parts by volume of pyridine, the mixture is heated to 75° C. and 70 parts of amidosulfonic acid are added. Within a few minutes the temperature of the reaction mixture rises to 95°–100° C. and when the evolution of heat has subsided is kept there for 30 minutes by external heating. 190 parts by volume are then distilled off at reduced pressure and the residue is dissolved in water.

The reaction may be carried out as well with the solvents indicated in Example 1.

The solution of the sulfuric acid ester which is obtained in a practically quantitative yield and has the formula

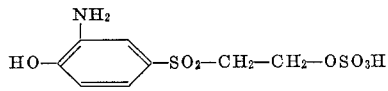

can be reacted further without isolation. After addition of the necessary amount of ice the acidified reaction solution (which shows an acid reaction to Congo paper) is diazotized at 0°–5° C. by means of sodium nitrite and subsequently coupled with 1-amino-8-hydroxynaphthalene-2,4-disulfonic acid. After a treatment with copper sulfate and salting out by means of potassium chloride the metallized azo dyestuff of the formula

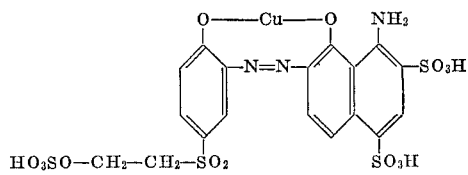

is obtained which is easily soluble in water and dyes cotton bluish violet shades.

EXAMPLE 3

32 parts of 3-(4'-aminobenzoylamino)-phenyl-(1)-β-hydroxyethylsulfone are introduced into 200 parts by volume of pyridine. The solution is heated to 80° C., 30 parts of aminodosulfonic acid are added and the whole is then heated for 30 mniutes to 100°–105° C. 150 parts by volume of pyridine are then distilled off at reduced pressure and the residue is taken up in 200 parts by volume of water.

The solution of the ester obtained which has the formula

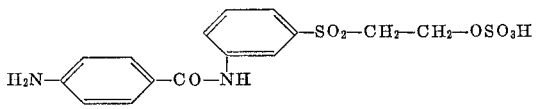

has a pH-value of about 6.5. The extent of the reaction is determined by analysis, corresponding to 100% of the theory.

The reaction can be carried out in analogous manner with the use of the solvents mentioned in Example 1.

The indirect diazotization of the reaction solution yields the corresponding diazonium salt in the form of a yellow finely crystalline precipitate, which is coupled with suitable coupling components to form water-soluble reactive dyestuffs. By coupling with 1-acetylamino-8-hydroxynaphthalene-3,6-disulfonic acid, for example, an azo dyestuff is obtained which dyes cotton brilliant bluish red shades. When using as coupling component 1-(4'-sulfophenyl)-3-carboxypyrazolone-(5) there is obtained a dyestuff which produces yellow dyeings on cotton.

EXAMPLE 4

23.1 parts of 3-amino-4-methoxy-phenyl-(1)-β-hydroxy-ethylsulfone are introduced into 200 parts by volume of pyridine. The solution is heated to 80° C. and 30 parts of amidosulfonic acid are added. Within a few minutes the temperature of the reaction mixture rises to 95°–100° C. without external heating and is kept for 30 minutes at 100°–105° C. Then about 150 parts by volume of pyridine are distilled off at reduced pressure and the residue is taken up in 200 parts by volume of water.

The solution of the sulfuric acid ester of the formula

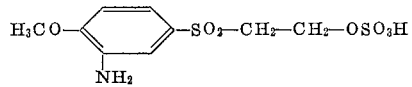

has a pH-value of about 6.5. The extent of the reaction is determined by analysis, corresponding to 100% of the theory.

The reaction can be carried out in analogous manner by means of the solvents indicated in Example 1.

After diazotiazation of the aqueous reaction solution in the usual manner, water-soluble reactive dyestuffs are obtained by coupling with suitable coupling components. By coupling with 1-acetylamino-8-hydroxynaphthalene-3,6-disulfonic acid, for example, an azo dyestuff is obtained which dyes cotton brilliant bluish red shades.

I claim:

1. A process for preparing a compound of the formula

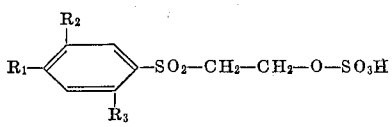

wherein $R_1$ represents a member selected from the group consisting of a hydrogen atom, hydroxyl, amino, aminomethyl, lower alkoxy and 3-methyl-pyrazol-5-one-1-yl radicals, $R_2$ represents a member selected from the group consisting of a hydrogen atom, lower alkoxy, amino, 4-aminobenzoylamino and 3-aminobenzoylamino radicals, at least one of said $R_1$ and $R_2$ being a hydroxyl or an amino radical, $R_3$ represents a member selected from the group consisting of hydrogen, chlorine and bromine atoms, lower alkyl, lower alkoxy and carboxylic acid radicals, which comprises esterifying an aromatic compound of the formula

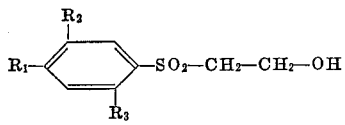

wherein $R_1$, $R_2$ and $R_3$ are defined as above, at an elevated temperature with amidosulfonic acid in the presence of dimethylforamide, dimethylsulfoxide, quinoline, dimethylaniline, pyridine, picoline, lutidine or mixtures thereof as an inert organic solvent.

2. A process as claimed in claim 1, wherein the esterification is carried out at a temperature within the range of about 75° to about 105° C.

3. A process as claimed in claim 1 wherein $R_1$ is a hydroxyl radical.

References Cited

UNITED STATES PATENTS

| | | | |
|---|---|---|---|
| 1,931,962 | 10/1933 | Marx et al. | 260—458 |
| 2,452,943 | 11/1948 | Malkemus et al. | 260—458 |
| 2,642,427 | 6/1953 | Hasbrouck | 260—458 |
| 2,849,450 | 8/1958 | Harrington | 260—458 |

OTHER REFERENCES

Burwell: Jour. Amer. Chem. Soc. vol. 71 pages 1769–71 (1949).

HENRY R. JILES, *Primary Examiner.*

N. TROUSOF, *Assistant Examiner.*